(12) United States Patent
Katsuki (10) Patent No.: US 9,825,501 B2
(45) Date of Patent: Nov. 21, 2017

(54) ROTOR WITH END RING AND ELECTRIC MOTOR

(71) Applicant: FANUC CORPORATION, Yamanashi (JP)

(72) Inventor: Kyohei Katsuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 138 days.

(21) Appl. No.: 14/623,958

(22) Filed: Feb. 17, 2015

(65) Prior Publication Data

US 2015/0244234 A1 Aug. 27, 2015

(30) Foreign Application Priority Data

Feb. 25, 2014 (JP) .................. 2014-034460

(51) Int. Cl.
*H02K 17/00* (2006.01)
*H02K 1/06* (2006.01)
*H02K 1/22* (2006.01)
*H02K 5/00* (2006.01)
*H02K 3/46* (2006.01)
*H02K 17/16* (2006.01)

(52) U.S. Cl.
CPC ............. *H02K 3/46* (2013.01); *H02K 17/165* (2013.01); *H02K 2205/12* (2013.01)

(58) Field of Classification Search
CPC ...................................... H02K 17/16
USPC .......... 310/211, 216.114, 261.1, 406; 29/598
See application file for complete search history.

(56) References Cited

U.S. PATENT DOCUMENTS

| 4,309,635 A | 1/1982 | Sei | |
| 4,970,424 A * | 11/1990 | Nakamura | H02K 17/165 310/211 |
| 5,444,319 A * | 8/1995 | Nakamura | H02K 17/165 29/598 |

(Continued)

FOREIGN PATENT DOCUMENTS

| JP | 54154014 A | 12/1979 |
| JP | 61132063 A * | 6/1986 |

(Continued)

OTHER PUBLICATIONS

Machine Translation JP61132063 (1986).*

(Continued)

*Primary Examiner* — Jose Gonzalez Quinones
(74) *Attorney, Agent, or Firm* — Fredrikson & Byron, P.A.

(57) ABSTRACT

An electric motor for high speed operation use and a rotor which enables use of common parts with electric motors for low speed operation use and which thereby enables reduction of the manufacturing costs. The rotor is provided with a shaft, a rotor core which is fastened to the shaft at the outside in the radial direction and has a first end face at one end in the axial direction and a second end face at the other end in the axial direction, a plurality of conductors which are arranged at the rotor core, and a pair of end rings which are respectively arranged adjoining the first end face and the second end face and which short-circuit the plurality of conductors with each other. The shaft has an outer circumference, while the end rings have outer circumferences which are arranged concentrically with respect to the outer circumference of the shaft.

8 Claims, 6 Drawing Sheets

(56) References Cited

U.S. PATENT DOCUMENTS

| | | | |
|---|---|---|---|
| 5,952,757 A | 9/1999 | Boyd et al. | |
| 2007/0069601 A1 | 3/2007 | Weihrauch | |
| 2010/0156207 A1 | 6/2010 | Pellegrino | |
| 2013/0113331 A1* | 5/2013 | Dolz | H02K 17/165 |
| | | | 310/211 |

FOREIGN PATENT DOCUMENTS

| | | |
|---|---|---|
| JP | H05048573 U | 6/1993 |
| JP | H09028064 A | 1/1997 |
| JP | 2003180056 A | 6/2003 |
| JP | 2013090447 A | 5/2013 |

OTHER PUBLICATIONS

English Translation of Japanese Publication No. 2003180056, published Jun. 27, 2003, 9 pages.
English Translation of Japanese Publication No. H09028064, published Jan. 28, 1997, 11 pages.
Partial English Translation of Japanese Publication No. H05048573, published Jun. 25, 1993, 6 pages.
English abstract fand machine translation for Japanese Publication No. JP 2013-090447 published May 13, 2013, 14 pgs.
English Abstract and Machine Translation for Japanese Publication No. JPS54-154014 A, published Dec. 4, 1979, 3 pgs.

\* cited by examiner

ROTOR WITH END RING AND ELECTRIC MOTOR

BACKGROUND OF THE INVENTION

1. Field of the Invention

The present invention relates to a rotor which is provided with end rings and to an electric motor.

2. Description of the Related Art

Known in the art is a rotor which is provided with end rings which short-circuit a plurality of conductors which are arranged at a rotor core, wherein reinforcing members for preventing deformation of the end rings when driving rotation of the rotor are attached to the outer circumferences of the end rings (for example, Japanese Patent Publication No. 2013-090447A).

In the above-mentioned rotor, a shaft, the end rings, and the reinforcing members are generally fabricated from different materials, so due to the difference in coefficients of thermal expansion among these members, sometimes the shaft ends up deforming at the time of operation of the rotor. According to the above patent publication, the reinforcing members are divided into a plurality of members to prevent such deformation of the shaft. However, according to this configuration, there is the problem that the number of parts which form the rotor increases and the work steps at the time of production increase, so the manufacturing cost rises.

Further, end rings easily deform when operating an electric motor at a high speed, so in the past, reinforcing members were assembled together with the end rings only in an electric motor for high speed operation use. Therefore, it had been difficult to make use of common parts for an electric motor for high speed operation use and an electric motor for low speed operation use.

SUMMARY OF INVENTION

In one aspect of the present invention, a rotor of an electric motor is provided with a shaft; a rotor core which is fixed to radially outside of the shaft and which includes a first end face at one end in the axial direction and a second end face at the other end in the axial direction; a plurality of conductors which are arranged at the rotor core, and each of which extends from the first end face to the second end face; and a pair of end rings, one of which is arranged adjacent to the first end face, and the other of which is arranged adjacent to the second end face, the end rings short-circuiting the plurality of conductors with each other. The shaft has an outer circumference which is centered about an axis of rotation, while the end ring has an outer circumference which is arranged concentrically with respect to the outer circumference of the shaft.

The rotor may be further provided with a reinforcing member which includes an inner ring part fitted over the outer circumference of the shaft; and an outer ring part connected to the inner ring part and fitted over the outer circumference of the end ring. The inner ring part may be housed in a space defined between the outer circumference of the shaft and the inner circumference of the end ring opposite to the outer circumference of the end ring.

The inner ring part may have a first inner circumference which contacts the outer circumference of the shaft. The outer ring part may have a second inner circumference which contacts the outer circumference of the end ring. The first inner circumference and the second inner circumference may be concentric with each other. The reinforcing member may further include a ring-shaped connecting part which extends from the inner ring parts to the outer ring parts in the radial direction. The end ring may be housed in a space defined by the inner ring part, the outer ring part, and the connecting part.

The inner ring part may include a plurality of weights arranged in the circumferential direction. Each of the plurality of weights may be inserted into a tap hole formed in the inner ring part. The reinforcing member may be made from a nonmagnetic metal which has a higher rigidity than aluminum. The reinforcing member may be fastened to the shaft by shrink fitting or screwing. In another aspect of the present invention, an electric motor is provided with the above-mentioned rotor.

BRIEF DESCRIPTION OF THE DRAWINGS

The above and other objects, features, and advantages of the present invention will become further clearer by the following description of the preferred embodiments given while referring to the attached drawings, in which.

DETAILED DESCRIPTION

Below, embodiments of the present invention will be explained in detail based on the figures. First, referring to FIG. 1, an electric motor 10 according to an embodiment of the present invention will be explained. Note that, in the following explanation, the "axial direction" is the direction along an axis O of rotation of the shaft 32 of the electric motor 10 shown in FIG. 1, the "radial direction" indicates the radial direction of a circle centered about the axis O, and the "circumferential direction" is the circumferential direction of the circle centered about the axis O. Further, "front in the axial direction (axially front)" shows the leftward in FIG. 1.

Figure 1:
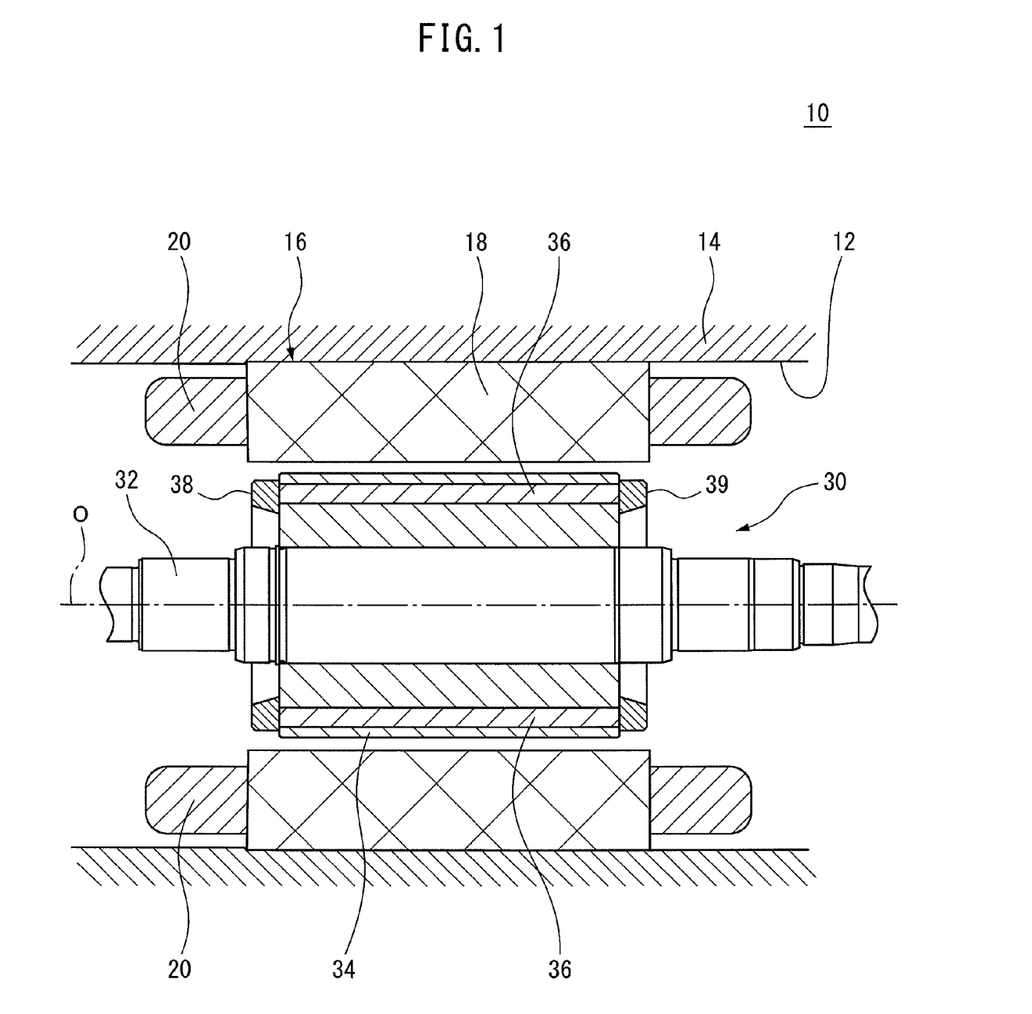
FIG. 1 is a cross-sectional view of an electric motor according to an embodiment of the present invention.

The electric motor 10 includes a housing 14 which defines an inside space 12; a stator 16 fixed in the inside space 12 of the housing 14; and a rotor 30 rotatably arranged radially inside (inside in the radial direction) of the stator 16. The stator 16 includes a stator core 18 and a coil 20 wound around the stator core 18. The rotor 30 includes a shaft 32 extending in the inside space 12 in the axial direction; a rotor core 34 fixed radially outside of the shaft 32; a plurality of conductors 36 arranged at the rotor core 34; and a pair of a first end ring 38 and a second end ring 39 short-circuiting the plurality of conductors 36.

Next, referring to FIG. 2, the configuration of the rotor 30 according to the present embodiment will be explained in more detail. The shaft 32 has a first outer circumference 40; a second outer circumference 42 adjoining the first outer circumference 40 at the front in the axial direction; and a third outer circumference 44 adjoining the first outer circumference 40 at the rear in the axial direction.

The first outer circumference 40 is configured from a cylindrical surface extending in the axial direction. The rotor core 34 is fixed radially outside of the first outer circumference 40. The second outer circumference 42 is constituted by a cylindrical surface having a diameter D1 and extending in the axial direction. Similarly, the third outer circumference 44 also is constituted by a cylindrical surface having the same diameter D1 as the second outer circumference 42 and extending in the axial direction.

The rotor core 34 is fabricated from a plurality of magnetic steel sheets stacked in the axial direction, and has an end face 50 at the front in the axial direction and an end face 52 at the rear in the axial direction. The rotor core 34 includes a center bore 46 and a plurality of through holes 48 formed radially outside of the center bore 46. These through holes 48 are arranged to be aligned in the circumferential direction at substantially equal intervals. The conductors 36 arranged at the through holes 48, the first end ring 38, and the second end ring 39 are integrally cast by aluminum die casting. Each of the conductors 36 extends from the axially front end face 50 of the rotor core 34 to the axially rear end face 52.

The first end ring 38 is a ring-shaped member arranged on the end face 50 of the rotor core 34 so as to extend in the circumferential direction. For example, the first end ring 38 is fabricated from a conductive material such as aluminum. The first end ring 38 short-circuits the axially front end of the plurality of conductors 36. The first end ring 38 has an outer circumference 54 and an inner circumference 56 opposite to the outer circumference 54. The outer circumference 54 is constituted by a cylindrical surface having a diameter D2, while the inner circumference 56 is constituted by a conical surface.

The second outer circumference 42 of the shaft 32 and the inner circumference 56 of the first end ring 38 define a space 58 therebetween. More specifically, the space 58 is a ring-shaped space defined by the second outer circumference 42 of the shaft 32, the inner circumference 56 of the first end ring 38, and the end face 50 of the rotor core 34.

In the present embodiment, the second outer circumference 42 of the shaft 32 and the outer circumference 54 of the first end ring 38 are concentric with each other about the axis O. The second outer circumference 42 of the shaft 32 and the outer circumference 54 of the first end ring 38 can be made concentric, e.g. by cutting the outer circumference 54 of the first end ring 38 after assembling the rotor 30 as shown in FIG. 2.

The second end ring 39 has a configuration the same as the first end ring 38. Specifically, the second end ring 39 is arranged on the end face 52 of the rotor core 34, and short-circuits the axially rear end of the plurality of conductors 36. The second end ring 39 has an outer circumference 60 and an inner circumference 62 opposite to the outer circumference 60. The outer circumference 60 is constituted by a cylindrical surface having a diameter D2 the same as the outer circumference 54 of the first end ring 38, while the inner circumference 56 is constituted by a conical surface.

A space 64 is defined between the third outer circumference 44 of the shaft 32 and the inner circumference 62 of the second end ring 39. Specifically, the space 64 is a ring-shaped space defined by the third outer circumference 44 of the shaft 32, the inner circumference 62 of the second end ring 39, and the end face 52 of the rotor core 34. Here, the third outer circumference 44 of the shaft 32 and the outer circumference 60 of the second end ring 39 are concentric with each other about the axis O.

Next, referring to FIG. 3, a rotor 70 according to another embodiment of the present invention will be explained. Note that, the same elements as the above-mentioned rotor 30 will be assigned the same reference numerals and detailed explanations thereof will be omitted. The rotor 70, in the same way as the above-mentioned rotor 30, is rotatably arranged radially inside of the stator 16 shown in FIG. 1, whereby an electric motor is constituted.

The rotor 70 includes a shaft 32, a rotor core 34, a plurality of conductors 36, a first end ring 38 and a second end ring 39, and a pair of a first reinforcing member 72 and second reinforcing member 74. The first reinforcing member 72 is fitted over the shaft 32 so as to be arranged at the radially front end face 50 of the rotor core 34. On the other hand, the second reinforcing member 74 is fitted over the shaft 32 so as to be arranged at the radially rear end face 52 of the rotor core 34.

Figure 4:
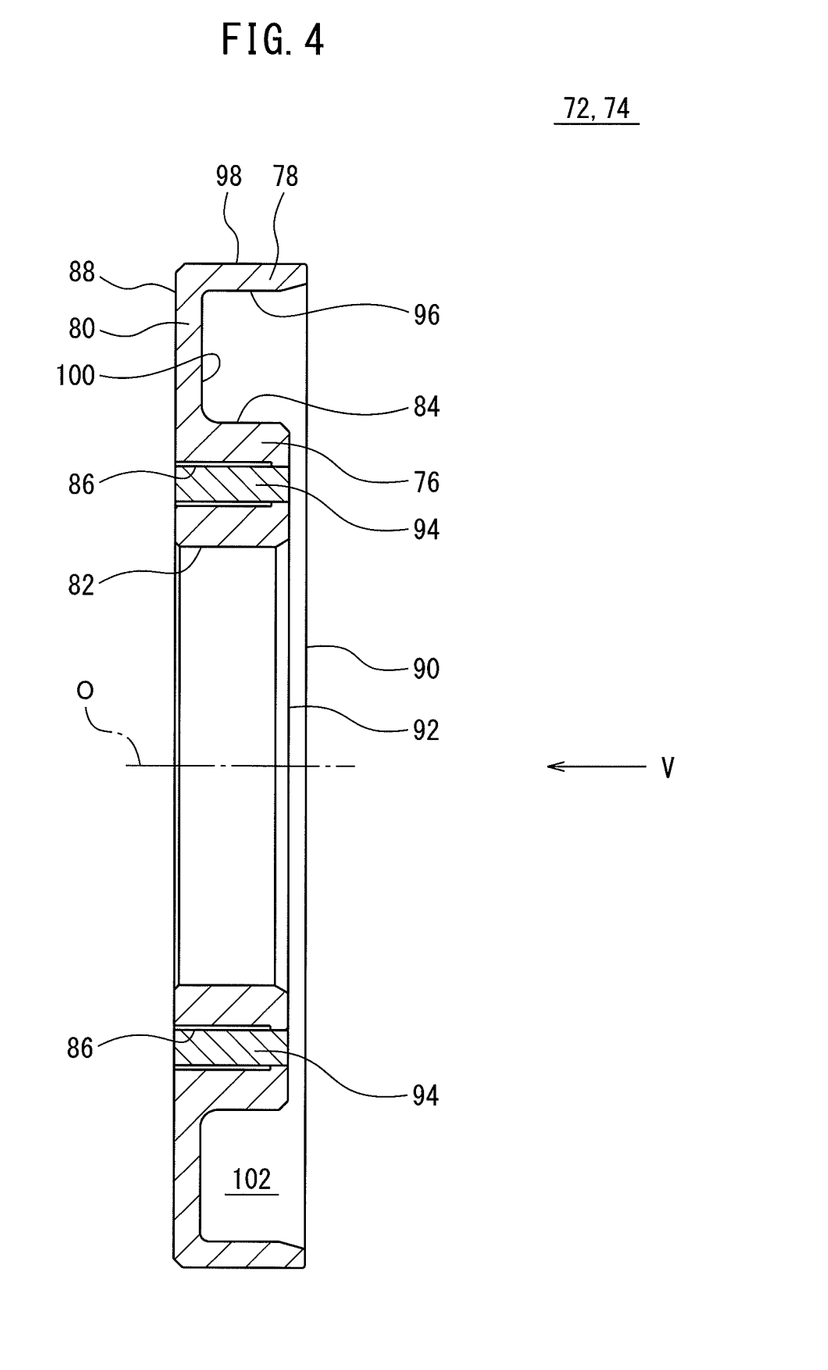
FIG. 4 is a cross-sectional view of the reinforcing member shown in FIG. 3.
Figure 5:
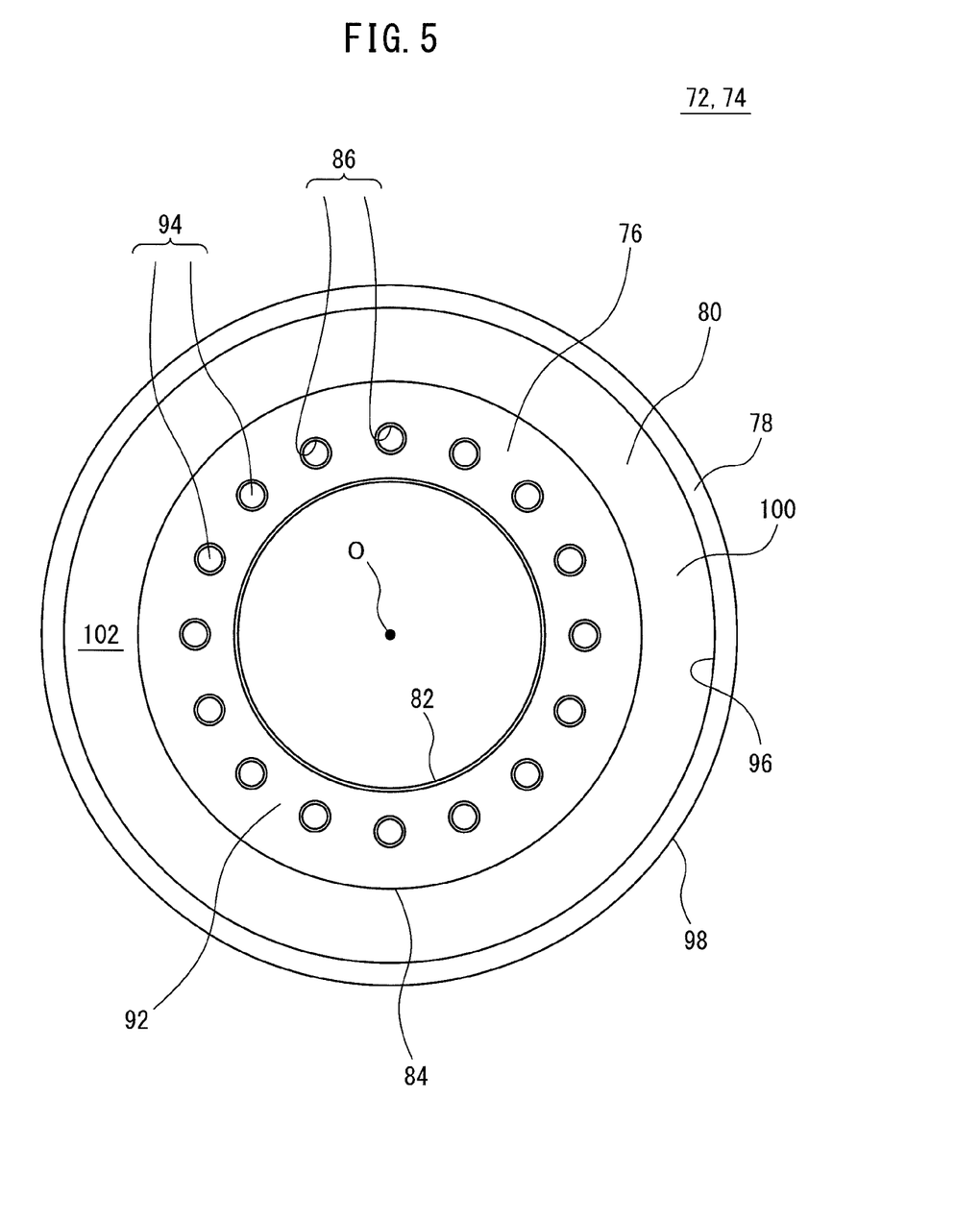
FIG. 5 is a view of the reinforcing member shown in FIG. 4 as seen from an arrow V in FIG. 4.

Next, referring to FIG. 4 and FIG. 5, the configuration of the first reinforcing member 72 will be explained. The first reinforcing member 72 is a monolithic ring member having an end face 88 at the front in the axial direction and an end face 90 at the rear in the axial direction. The first reinforcing member 72 is made from nonmagnetic metal, such as nickel or titanium, which has higher rigidity than aluminum or copper. The first reinforcing member 72 includes an inner ring part 76; an outer ring part 78; and a ring-shaped connecting part 80 extending between the inner ring part 76 and the outer ring part 78.

The inner ring part 76 has an inner circumference 82; an outer circumference 84 opposite to the inner circumference 82; and an end face 92 at the rear in the axial direction. The axially rear end face 92 of the inner ring part 76 is positioned slightly frontward in the axial direction relative to the above end face 90. A plurality of tap holes 86 are formed at the inner ring part 76 so as to extend from the end face 88 to the end face 92.

These tap holes 86 are arranged in the circumferential direction at substantially equal intervals. A weight 94 is inserted into each of the tap holes 86. In the present embodiment, the inner ring part 76 is formed with a total of 16 tap holes 86 into which weights 94 are inserted. These weights 94 function to adjust the rotational balance of the rotor 70 when driving the rotor 70 to rotate.

The outer ring part 78 is a cylindrical member arranged so as to be separated from the inner ring part 76 at radially outside of the inner ring part 76. Specifically, the outer ring part 78 has an inner circumference 96 and an outer circumference 98 opposite to the inner circumference 96. The connecting part 80 extends from the inner ring part 76 to the outer ring part 78 in the radial direction. More specifically, the connecting part 80 has the end face 100 at the rear side in the axial direction, and connects the axially front end of the inner ring part 76 and the axially front end of the outer ring part 78 each other.

A ring-shaped space 102 is defined by the outer circumference 84 of the inner ring part 76, the inner circumference 96 of the outer ring part 78, and the end face 100 of the connecting part 80. In the present embodiment, the inner circumference 82 of the inner ring part 76 and the inner circumference 96 of the outer ring part 78 are concentric with each other about the axis O.

The second reinforcing member 74 has the same configuration as the above first reinforcing member 72. That is, the second reinforcing member 74 is a monolithic ring member including an inner ring part 76, outer ring part 78, and connecting part 80. Further, the inner ring part 76 is formed with tap holes 86, into each of which a weight 94 is inserted.

The second reinforcing member 74 includes a ring shaped space 102 defined by the outer circumference 84 of the inner ring part 76, the inner circumference 96 of the outer ring part 78, and the end face 100 of the connecting part 80. Further, in the second reinforcing member 74, the inner circumference 82 of the inner ring part 76 and the inner circumference 96 of the outer ring part 78 are concentric with each other.

Figure 6:
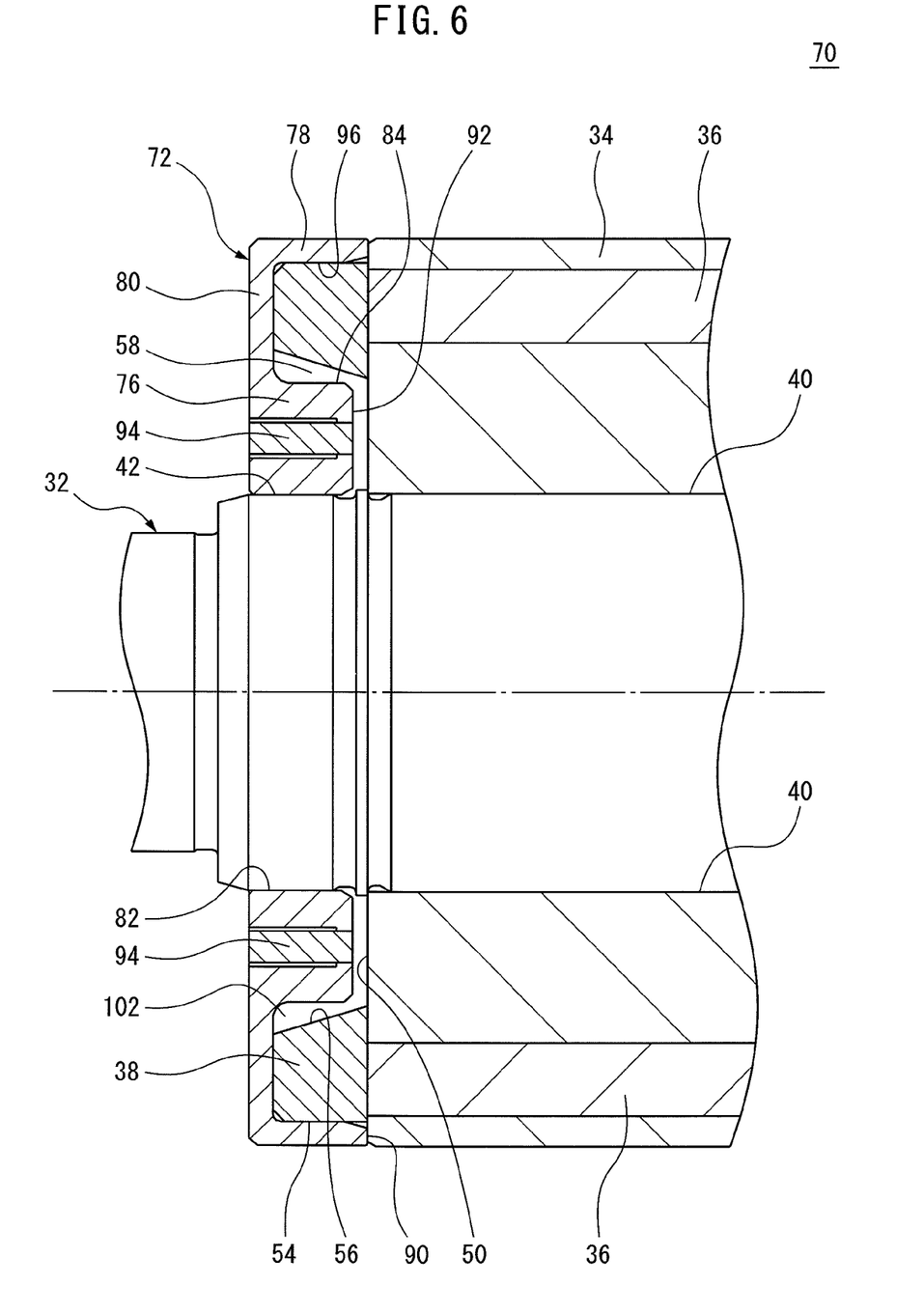
FIG. 6 is an enlarged view of the region VI in FIG. 3.

Next, referring to FIG. 3 to FIG. 6, the mounting structures of the first reinforcing member 72 and second reinforcing member 74 will be explained in detail. As shown in FIG. 6, the first reinforcing member 72 is fitted over the shaft 32 from the axially front side, and fastened on the axially front end face 50 of the rotor core 34 by e.g. screwing or shrink fitting. In this state, the inner ring part 76 of the first reinforcing member 72 is fitted over the radially outside of the second outer circumference 42 of the shaft 32, thereby the inner circumference 82 of the inner ring part 76 contacts the second outer circumference 42.

Further, the outer ring part 78 of the first reinforcing member 72 is fitted over the radially outside of the outer circumference 54 of the first end ring 38. In this state, the inner circumference 96 of the outer ring part 78 contacts the outer circumference 54 of the first end ring 38. Further, the inner ring part 76 of the first reinforcing member 72 is housed in the space 58, and the first end ring 38 is housed in the space 102.

Similar as the first reinforcing member 72, the second reinforcing member 74 is also fastened to the rotor core 34 at the rear in the axial direction by e.g. screwing or shrink fitting. Specifically, as shown in FIG. 3, the inner ring part 76 of the second reinforcing member 74 is fitted over the radially outside of the third outer circumference 44 of the shaft 32, thereby the inner circumference 82 of the inner ring part 76 contacts the third outer circumference 44.

Further, the outer ring part 78 of the second reinforcing member 74 is fitted over the radially outside of the outer circumference 60 of the second end ring 39. In this state, the inner circumference 96 of the outer ring part 78 contacts the outer circumference 60 of the second end ring 39. Further, the inner ring part 76 of the second reinforcing member 74 is housed in the space 58, while the second end ring 39 is housed in the space 102.

Figure 2:
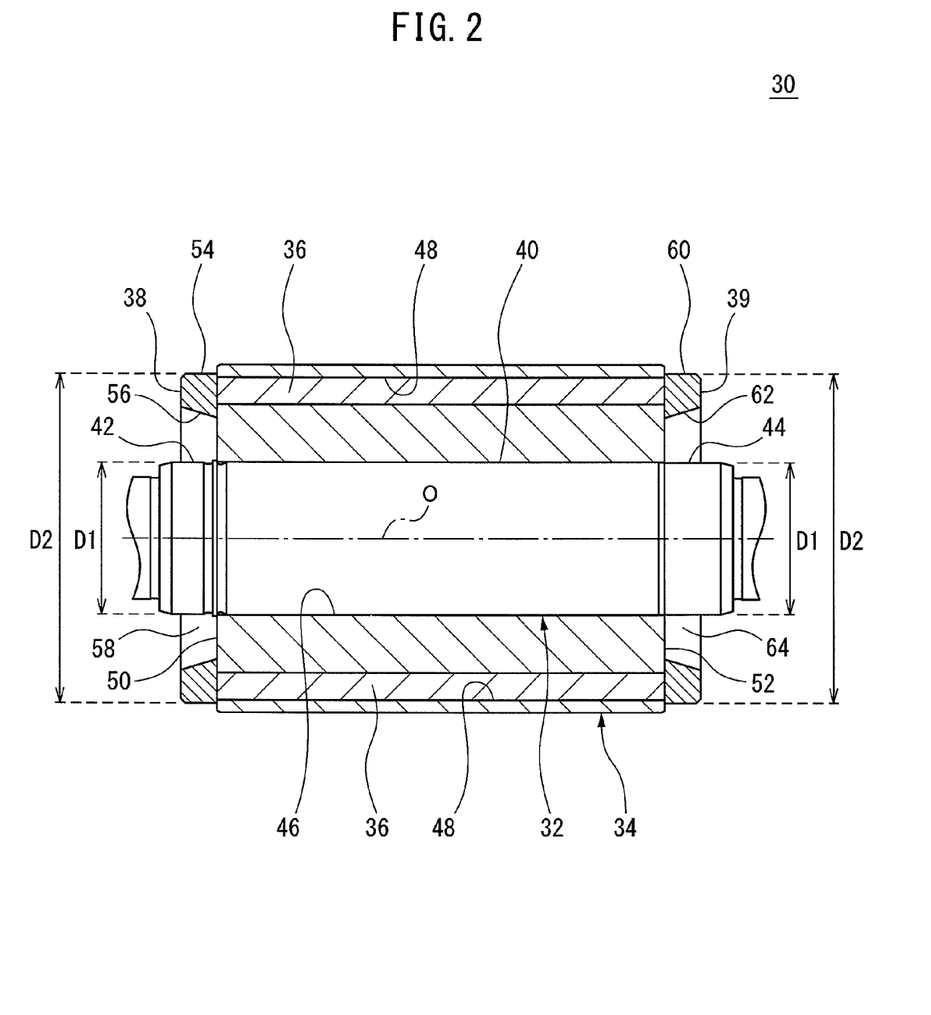
FIG. 2 is a cross-sectional view of the rotor shown in FIG. 1.

The rotor 30 shown in FIG. 2 can be used as an electric motor for low speed rotation. The reason for it is that, it is not necessary to attach reinforcing members 72, 74 as in the rotor 70 shown in FIG. 3, since the end rings 38, 39 hardly deform when the rotor 30 rotates at a low speed.

Figure 3:
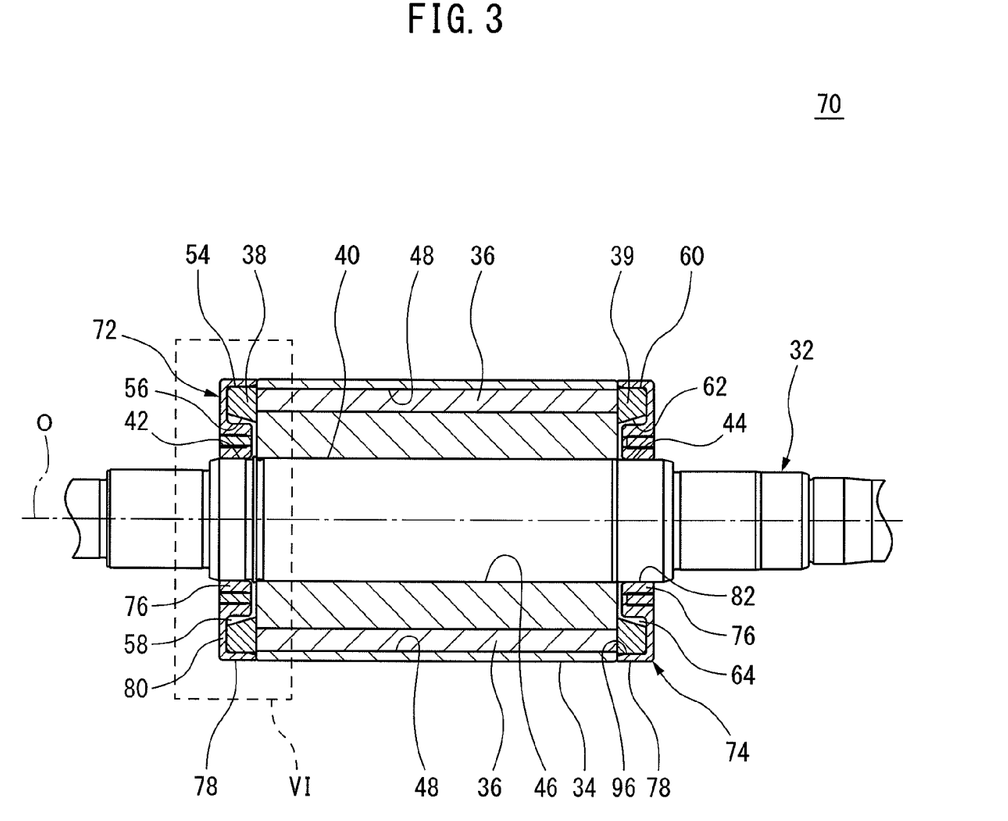
FIG. 3 is a cross-sectional view of a rotor according to another embodiment of the present invention.

On the other hand, the rotor 70 shown in FIG. 3 can be used for an electric motor for high speed rotation. It is necessary to attach reinforcing members 72, 74, since the end rings 38, 39 easily deform due to the centrifugal force when the rotor 70 rotates at a high speed, as explained above.

According to the present embodiment, it is possible to constitute a rotor 70 suitable for high speed rotation by just attaching reinforcing members 72, 74 by screwing etc. to a rotor 30 suitable for low speed rotation. Therefore, it is possible to make use of common parts for almost all of the parts of the rotor 30 for low speed rotation and rotor 70 for high speed rotation. Due to this, it is possible to efficiently produce a rotor in response to the required application (rotation speed) while decreasing manufacturing costs.

Further, according to the rotor 70 shown in FIG. 3, the inner ring part 76 of the reinforcing members 72, 74 is fastened to the shaft 32, while the outer ring part 78, which is integrally connected to the inner ring parts 76 via the connecting part 80, can hold the end ring 38, 39 from the radially outside. Due to this, it is possible to effectively prevent the end rings 38, 39 from deforming toward radially outside when the rotor 70 rotates at high speed.

Further, according to the rotor 70, the second outer circumference 42 of the shaft 32 and the outer circumference 54 of the first end ring 38 become concentric, and also the inner circumference 82 of the inner ring part 76 of the first reinforcing member 72 and the inner circumference 96 of the outer ring part 78 of the first reinforcing member 72 become concentric. Similarly, the third outer circumference 44 of the shaft 32 and the outer circumference 60 of the second end ring 39 become concentric, and also the inner circumference 82 of the inner ring part 76 of the second reinforcing member 74 and the inner circumference 96 of the outer ring part 78 of the second reinforcing member 74 become concentric.

According to this configuration, when assembling the rotor 70 in the electric motor shown in FIG. 1 and operating it and the rotor 70 becomes high in temperature, the degrees of heat expansion of the shaft 32, reinforcing members 72, 74, and end rings 38, 39 can be made uniform, whereby it is possible to prevent the shaft 32 from deforming.

Further, in the rotor 70, the inner ring parts 76 of the reinforcing members 72, 74 are housed in the spaces 58, and the end rings 38, 39 are housed in the spaces 102. According to this configuration, it is possible to reduce the dead space formed between the reinforcing member 72, 74 and the rotor core 34 when attaching the reinforcing member 72, 74 to the rotor core 34, whereby it is possible to make the rotor 70 more compact.

Note that, in the above-mentioned embodiment, the case was explained where the second outer circumference 42 and the third outer circumference 44 of the shaft 32 and the outer circumferences 54, 60 of the end rings 38, 39 were configured from cylindrical surfaces. However, the invention is not limited to this. These outer circumferences may also, for example, be defined by tips of pluralities of projecting parts which are arranged in the circumferential directions. Similarly, the inner circumference 82 of the inner ring part 76 and the inner circumference 96 of the outer ring part 78 are not limited to cylindrical surfaces. For example, they may also be defined by tips of pluralities of projecting parts which are arranged in the circumferential directions.

Above, the present invention was explained through embodiments of the present invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the present invention as clear from the claim language.

The invention claimed is:

1. A rotor of an electric motor, comprising:
    a shaft extending along an axis of rotation of the rotor, the shaft including:
        a first outer circumference;
        a second outer circumference adjoining the first outer circumference in a first direction of the axis; and
        a groove formed between the first outer circumference and the second outer circumference so as to divide the first outer circumference and the second outer circumference in the axis-direction;
    a rotor core fixed radially outside of the first outer circumference, and having a first end face in the first direction and a second end face opposite the first end face;

a plurality of conductors arranged at the rotor core, each of the plurality of conductors extending from the first end face to the second end face; and an end ring arranged adjacent to the first end face, the end ring short-circuiting the plurality of conductors with each other; and a reinforcing member including:
- an inner ring part fitted over the second outer circumference of the shaft; and
- an outer ring part connected to the inner ring part and fitted over an outer circumference of the end ring,
- wherein the inner ring part has a first inner circumference contacting the second outer circumference of the shaft the shaft,
- the outer ring part has a second inner circumference contacting the outer circumference of the end ring, and
- the second outer circumference of the shaft, the outer circumference of the end ring, the first inner circumference of the inner ring part, and the second inner circumference of the outer ring part are concentric with each other about the axis.

2. The rotor according to claim 1, wherein the inner ring part is housed in a space defined between the outer circumference of the shaft and an inner circumference of the end ring opposite to the outer circumference of the end ring.

3. The rotor according to claim 1, wherein
the reinforcing member further includes a ring-shaped connecting part radially extending from the inner ring part to the outer ring part,
the end ring is housed in a space defined by the inner ring part, the outer ring part, and the connecting part.

4. The rotor according to claim 1, wherein the inner ring part includes a plurality of weights arranged in the circumferential direction.

5. The rotor according to claim 4, wherein each of the plurality of weights is inserted into a tap hole formed in the inner ring part.

6. The rotor according to claim 1, wherein the reinforcing member is made from a nonmagnetic material having a higher rigidity than aluminum.

7. The rotor according to claim 1, wherein the reinforcing member is fastened to the shaft by shrink fitting or screwing.

8. An electric motor comprising a rotor according to claim 1.

* * * * *